United States Patent [19]

Lewis

[11] Patent Number: 5,306,098
[45] Date of Patent: Apr. 26, 1994

[54] PLASTIC DRIVE FASTENER

[75] Inventor: Jeffrey C. Lewis, Rochester Hills, Mich.

[73] Assignee: TRW Inc., Cleveland, Ohio

[21] Appl. No.: 12,237

[22] Filed: Feb. 2, 1993

[51] Int. Cl.$^5$ ............................................. F16B 19/00
[52] U.S. Cl. ..................... 411/510; 411/913
[58] Field of Search ......................... 411/508–510, 411/338, 339, 913

[56] References Cited

U.S. PATENT DOCUMENTS

| | | |
|---|---|---|
| 3,494,244 | 2/1970 | Wayland . |
| 4,381,633 | 5/1983 | MacLeod .................. 411/510 X |
| 4,396,329 | 8/1983 | Wollar ...................... 411/510 X |
| 4,704,059 | 11/1987 | Nakama et al. ........... 411/913 X |
| 4,762,437 | 8/1988 | Mitomi ...................... 411/913 X |
| 5,011,356 | 4/1991 | Fernandez ................. 411/508 X |
| 5,039,267 | 8/1991 | Wollar . |

FOREIGN PATENT DOCUMENTS 1020694 2/1966 United Kingdom ............... 411/510

Primary Examiner—Neill R. Wilson
Attorney, Agent, or Firm—Fay, Sharpe, Beall, Fagan, Minnich & McKee

[57] ABSTRACT

A one-piece plastic drive fastener comprises an enlarged head with a rigid cylindrical shank extending therefrom and terminating in a free end. Four circumferentially spaced axial rows of wing elements extend generally radially outwardly from the shank. The wing elements each have the shape of a segment of a thin walled truncated cone with a narrow first end joined to the cylindrical shank and a wider second end spaced outwardly of the shank and inclined toward the head portion. The wing members are freely flexible in the direction toward the head portion with the wing elements in each row being relatively uniformly spaced axially of the shank but axially offset from the wing elements in the next adjacent rows.

2 Claims, 1 Drawing Sheet

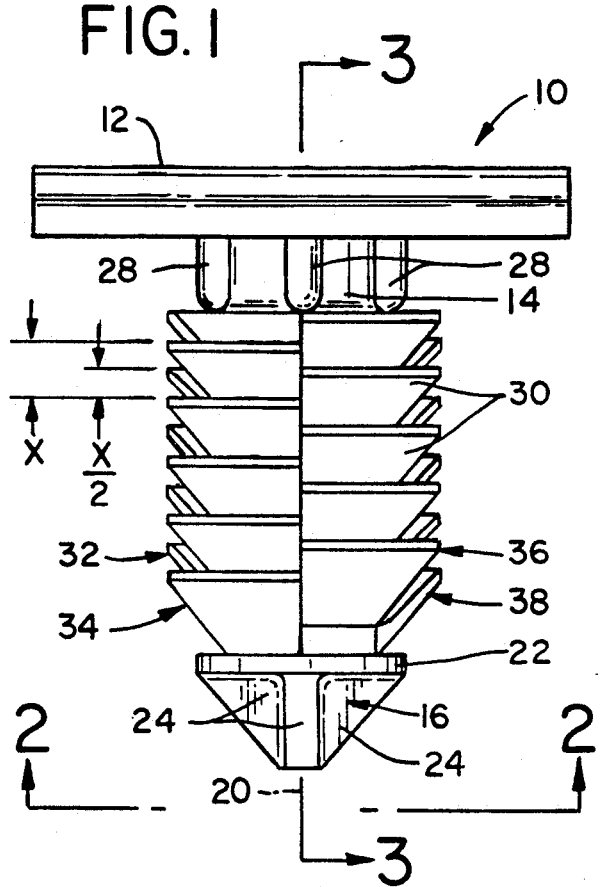
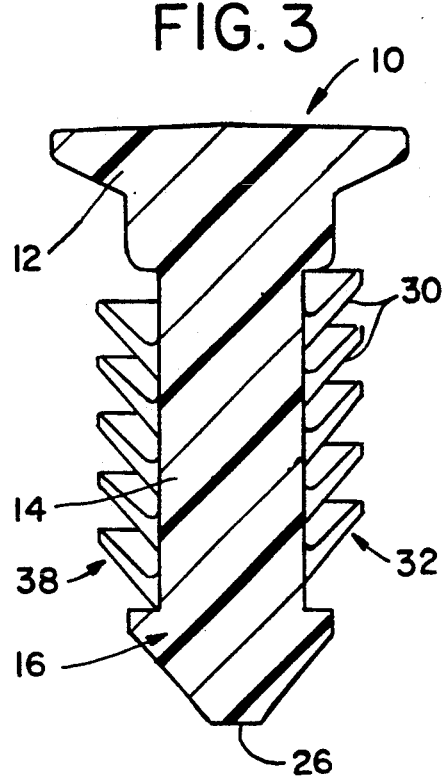
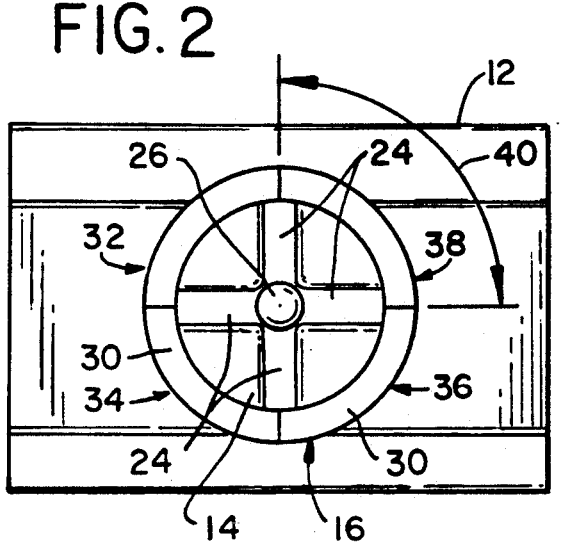
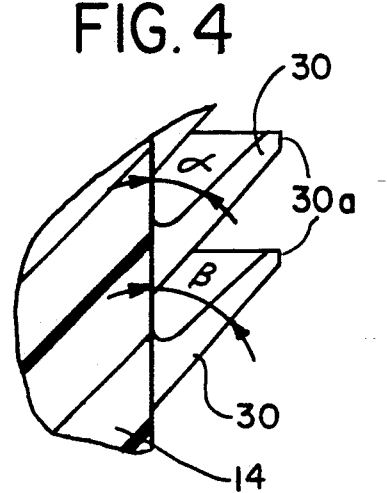

5,306,098

1

PLASTIC DRIVE FASTENER

BACKGROUND OF THE INVENTION

The subject invention is directed toward the art of fasteners and, more particularly, to a one-piece, molded plastic drive fastener.

A variety of plastic drive fasteners exist for securing members of varying thickness to one another. The fasteners are designed for push-in installation into preformed openings in the members being joined. One of the primary design goals with respect to such fasteners is to have low insertion force requirements combined with high fastener retention force. It is also desirable that the fasteners achieve precise fit and gripping with a range of thickness variations in the members being joined.

Originally, the fasteners were primarily used in round openings. More recently, however, the fasteners have been used in slotted openings. The drive fasteners currently available are generally capable of functioning adequately in either one or the other of the two types of openings but not in both.

SUMMARY OF THE INVENTION

A primary object of the subject invention is to provide a drive or push-in type fastener which can give satisfactory performance in either a round or slotted opening.

In accordance with the subjection invention, there is provided a one-piece drive fastener formed of plastic material for insertion through an aperture in a member and comprising an enlarged head having a rigid, cylindrical shank extending therefrom and terminating in a free end. A plurality of circumferentially spaced axial rows of aligned wing members extend generally radially outward from the shank. The wing elements each have the shape of an axially continuous circumferential segment of a thin walled truncated cone with a narrow first end joined to the cylindrical shank and a wider second end spaced outwardly of the shank and inclined toward the head. The wing elements are freely flexible in the direction toward the head but resist deflection in the direction away from the head and the wing elements in each row are spaced relatively uniformly axially along the shank but are axially offset from the wing elements in the next adjacent row.

Preferably, and in accordance with a more limited aspect of the invention, there are four rows of wing elements each having approximately a 90° circumferential extent relative to the shank.

In accordance with a still further and somewhat more limited aspect of the invention, the wing elements are integral with shank and have a circumferential extent which is substantially equal to that of the wing elements in every other row.

In accordance with yet another aspect of the invention, the wing elements form an angle relative to the shaft in the range of approximately 30° to 60°.

By forming the wing element as sections of a truncated cone and having their extent generally as indicated, the insertion forces are reduced relative to those prior art fasteners which have continuous circumferential conical wing sections. That is, the segmented wing design lessens the hoop stresses generated upon insertion of the fastener into a panel or work piece opening. However, engagement with the opening is maintained around the full circumference of the fastener. By using

2 a design wherein the hoop stress generated upon insertion is reduced, the total wing element contact and engagement with the work piece can be greatly increased without significantly increasing the insertion force. On the other hand, however, the withdrawal force is significantly increased because of the increased surface contact area and the fact that the wings may be made somewhat more rigid and thereby provide greater resistance to bending away from the head.

BRIEF DESCRIPTION OF THE DRAWINGS

The above and other objects and advantages will become apparent from the following description when read in conjunction with the accompanying drawings wherein:

FIG. 1 is a side elevational view of a push-in type fastener formed in accordance with a preferred embodiment;

FIG. 2 is an end view of the fastener shown in FIG. 1, the FIG. 2 view is taken on line 2—2 of FIG. 1;

FIG. 3 is a longitudinal cross-sectional view taken on line 3—3 of FIG. 1; and

FIG. 4 is a greatly enlarged view of the circled area of FIG. 3 to more clearly show the preferred form for the fins or wing members.

DETAILED DESCRIPTION OF THE PREFERRED EMBODIMENT

Referring more particularly to the drawings wherein the showings are for the purpose of illustrating a preferred embodiment of the invention only, and not for the purpose of limiting same, FIG. 1 shows the overall arrangement of a one-piece, push-in type fastener 10 which is integrally molded from resilient plastics material such as nylon, high density polyethylene or any suitable relatively dense, high impact plastic having suitable strength and flexibility characteristics.

The fastener 10 generally comprises an enlarged head 12 and a rigid, cylindrical shank 14 which extends integrally therefrom and terminates in a free end nose portion 16. As can be appreciated, the head 12 can be a simple enlarged body of any geometric shape or it can be an integral component such as a tube or wiring retainer or a similar mechanical component to be connected to a work piece, panel, or the like. In any event, in the subject embodiment the head 12 is shown as having a generally rectangular shape and extending laterally from the central axis 20 of the shank 14. As shown in FIGS. 2 and 3, the width of the head portion 12, as well as its length, is significantly greater than the diameter of the shank 14.

The free end or nose portion 16 of the fastener 10 has a generally conical shape which includes what can be referred to as a circular base element 22 and four triangularly shaped sections 24 which extend therefrom and join at a rounded end portion 26. This arrangement acts to align and guide the shank 14 during insertion into the suitable preformed opening in the work piece. It should be understood that the size of the preformed work piece opening must be only slightly greater than the diameter of the circular base element 22.

It should further be noted that the juncture between the shank 14 and the head portion 12 is provided with a plurality of raised beads or outwardly extending rib sections 28. In the preferred embodiment, there are four of the rib sections 28 which are positioned at 90° intervals circumferentially about shank 14. The total outward extent of the ribs 28 corresponds generally to the diameter of the nose base portion 22. That is, the ribs 28 are such that this portion of the shank could be received within the preformed work piece opening into which the fastener is to inserted. The ribs thus act to maintain the fastener suitably centered and located within the work piece opening.

As previously mentioned, it is highly desirable that fasteners of the subject type can be capable of use in both round and slotted or elongated openings. The subject design is such that it can be used with equal facility in both circular openings of a size only slightly larger than the diameter of nose base portion 22 or in a elongated slotted openings having a width only slightly greater than the diameter of the circular nose portion 22. In this regard, the subject fastener includes a plurality of circumferentially spaced rows of axially aligned wing or fin elements 30. As best shown in FIGS. 1 and 2, there are preferably four such aligned rows 32, 34, 36 and 38. The wing elements in each of the four rows preferably have an identical configuration in the shape of a segment of a thin walled truncated cone. Preferably, as shown in FIG. 2, the circumferential extent of each of the wing elements 30 and each of the rows 32, 34, 36 and 38 is approximately 90° as shown at 40. That is, the circumferential extent of each wing element and its corresponding aligned row is 90° portion of the total circumference about the shank 14.

As illustrated in FIGS. 1, 3, and 4, each of the wing elements 30 is positioned and configured so as to be inclined toward the head portion 12 and to be flexible in a direction toward head 14 while resisting deflection toward the free end 16. By subdividing the wing elements 30 into 90° segments and having four groups of them to otherwise extend completely about the shank 14 with no spacings or gaps therebetween, the fastener can be used with equal facility and performance in both circular openings and slotted openings. As compared to such circular fasteners having full circumferentially continuous conical wings (for example U.S. Pat. No. 494,244), there is a significant reduction in the hoop stresses generated during insertion of the fastener into the work piece opening. The force is required for extraction, however, remains at a high level. Additionally, this subject design can be used in slotted openings and offers significant advantage relative to those designs which are limited to use in slotted openings (for example, see the design as shown in U.S. Pat. No. 5,039,267).

Preferably, the individual wing sections have the specific construction more clearly illustrated in FIG. 4. In this preferred form, the lower or forward surface of each of the wing elements 30 makes an angle $\beta$ relative to the shank 14 which is in the range of 30° to 60° with 45° being preferred. Likewise, the rearward surface of each wing element preferably makes an angle a which is in the range of 2° to 7° greater than the corresponding angle $\beta$. Thus, the individual wings preferably taper in thickness from a thicker base portion connected to shank 14, to a thinner outer free end portion 30a.

In addition to the above, it is greatly preferred that the wing members in each of the rows 32, 34, 36 and 38 be uniformly spaced but axially offset from those wings in the adjacent row. This is illustrated generally in FIG. 2 wherein the spacing between the individual wing members 30 in row 34 are indicated as spaced the distance X whereas those in row 32 are also spaced apart a distance X but axially offset by ½ X from the wing members in row 34. Preferably, as can be seen in FIG. 2, the wing members in each of the four separate rows are offset from those in adjacent rows. Stated another way, the diagonally opposite rows 32 and 36 are in alignment but axially offset from rows 34 and 38. Rows 34 and 38 are also in axially aligned relationship, however. This offset relationship allows the fastener to better conform and engage with varying work piece thicknesses.

Referring again to the nose portion 16 and its circular base element 22, it should be noted that the base element 22 is preferably sized so that it extends outwardly in a radially direction no more than approximately ½ of the distance from the shank to the free end of the individual wing members 30. This assures that the wing members and their dimensional relationships to the work piece opening are such that the edge of the opening engages the wings at their midpoint. Additionally, the nose 22 in combination with the raised portions 28 adjacent the head 12 maintain the fastener centered and thus the wings are constantly centered and aligned with the opening both during insertion and when in use and in place in the opening.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A one-piece drive fastener formed of plastics material for insertion through an aperture in a member comprising:

an enlarged head portion;

a rigid cylindrical shank extending from the head portion and terminating in a free end;

four circumferentially spaced rows of axially aligned wing elements extending generally radially outwardly from the shank, each row of wing elements abutting the next adjacent row and having a circumferential extent relative to the shank of approximately 90° and the wing elements in each row having the shape of an axially continuous circumferential segment of a thin walled truncated cone with a narrow first end joined to the cylindrical shank and a wider second end spaced outwardly of the shank and inclined toward the head portion and being freely flexible in the direction toward the head portion, the wing elements in each row being relatively uniformly spaced axially of the shank and axially offset from the wing elements in the next adjacent rows by an amount equal to approximately one-half of the axial distance between adjacent wing elements in the row, each wing element in each row uniformly tapering in thickness from a thick base portion to a thinner tip portion.

2. The drive fastener as defined in claim 1 wherein the wing elements in each aligned row are inclined toward the head portion at the same angle in the range of 30° to 60°.

* * * * *